US012632277B2

(12) United States Patent
Imamoto

(10) Patent No.: US 12,632,277 B2
(45) Date of Patent: May 19, 2026

(54) INFORMATION PROCESSING DEVICE, ANOMALY DETECTION METHOD, AND COMPUTER-READABLE RECORDING MEDIUM

(71) Applicant: Panasonic Intellectual Property Management Co., Ltd., Osaka (JP)

(72) Inventor: Yoshiharu Imamoto, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 676 days.

(21) Appl. No.: 17/830,104

(22) Filed: Jun. 1, 2022

(65) Prior Publication Data

US 2022/0291944 A1    Sep. 15, 2022

Related U.S. Application Data

(63) Continuation of application No. PCT/JP2020/033896, filed on Sep. 8, 2020.

(30) Foreign Application Priority Data

Dec. 5, 2019    (JP) ................................. 2019-220119

(51) Int. Cl.
G06F 9/455 (2018.01)
G06F 11/07 (2006.01)
(52) U.S. Cl.
CPC ...... G06F 9/45558 (2013.01); G06F 11/0712 (2013.01); *G06F 2009/45587* (2013.01); *G06F 2009/45591* (2013.01)
(58) Field of Classification Search
None
See application file for complete search history.

(56) References Cited

U.S. PATENT DOCUMENTS 6,912,279 B2 * 6/2005 Malhotra ............. H04Q 3/0025
379/230
8,321,936 B1 * 11/2012 Green ................. H04L 63/1416
718/1

(Continued)

FOREIGN PATENT DOCUMENTS

CN          104685507          6/2015
JP          2013-131907          7/2013

(Continued)

OTHER PUBLICATIONS

International Search Report (ISR) from International Searching Authority (Japan Patent Office) in International Pat. Appl. No. PCT/JP2020/033896, dated Dec. 1, 2020, together with an English language translation.

(Continued)

*Primary Examiner* — Chat C Do
*Assistant Examiner* — William C Wood
(74) *Attorney, Agent, or Firm* — Greenblum & Bernstein, P.L.C.

(57) ABSTRACT

In an ECU, virtualization software operates a first virtual machine (VM) and a second VM. A transfer unit of the second VM acknowledges communication data transmitted from the first VM and destined to the second VM. A transfer unit generates a parameter related to communication between the VMs, based on the communication data acknowledged. A detection unit of the second VM detects abnormal communication, based on the parameter generated by the transfer unit.

12 Claims, 14 Drawing Sheets

(56) References Cited

U.S. PATENT DOCUMENTS

| | | | |
|---|---|---|---|
| 9,298,910 B2 | 3/2016 | Dalcher et al. | |
| 9,444,689 B2 * | 9/2016 | Senniappan | H04L 41/122 |
| 9,571,507 B2 | 2/2017 | Cooper et al. | |
| 10,032,024 B2 | 7/2018 | Dalcher et al. | |
| 11,025,647 B2 | 6/2021 | Cooper et al. | |
| 2012/0110574 A1 * | 5/2012 | Kumar | G06F 9/45558 |
| | | | 718/1 |
| 2012/0317570 A1 | 12/2012 | Dalcher et al. | |
| 2014/0115578 A1 | 4/2014 | Cooper et al. | |
| 2014/0201451 A1 * | 7/2014 | Dube | G06F 12/08 |
| | | | 711/130 |
| 2015/0066239 A1 | 3/2015 | Mabuchi | |
| 2016/0224792 A1 | 8/2016 | Dalcher et al. | |
| 2017/0264622 A1 | 9/2017 | Cooper et al. | |
| 2018/0046559 A1 * | 2/2018 | Shimokuni | G06F 11/0712 |
| 2018/0181421 A1 * | 6/2018 | Connor | G06F 9/45558 |
| 2021/0109798 A1 * | 4/2021 | Kaplan | G06F 9/45558 |
| 2021/0178995 A1 * | 6/2021 | Koyama | H04L 63/1433 |
| 2021/0286873 A1 * | 9/2021 | El-Moussa | G06F 21/56 |
| 2021/0344692 A1 | 11/2021 | Cooper et al. | |

FOREIGN PATENT DOCUMENTS

| | | |
|---|---|---|
| JP | 2013-242644 | 12/2013 |
| JP | 5522160 | 6/2014 |
| JP | 5861228 | 2/2016 |
| JP | 2017-068512 | 4/2017 |
| JP | 2017-174158 | 9/2017 |
| JP | 2019-066995 | 4/2019 |
| JP | 2019-144785 | 8/2019 |

OTHER PUBLICATIONS

Anzai et al., "A proposal of intrusion detection and prevention system for automatic driving vehicles", Proceedings of 2018 Symposium on Cryptography and Information Security, Jan. 26, 2018, pp. 1-6, together with a partial English language translation.

Office Action issued by the China National Intellectual Property Administration (CNIPA) in Chinese Patent Application No. 202080084034.7, dated Oct. 31, 2023, together with an English language translation.

* cited by examiner

FIG. 4

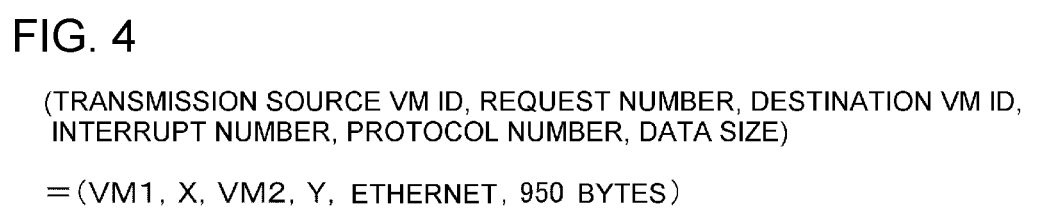

(TRANSMISSION SOURCE VM ID, REQUEST NUMBER, DESTINATION VM ID,
 INTERRUPT NUMBER, PROTOCOL NUMBER, DATA SIZE)

=(VM1, X, VM2, Y, ETHERNET, 950 BYTES)

FIG. 5

| ID | TRANSMISSION SOURCE | REQUEST NUMBER | DESTINATION VM | INTERRUPT NUMBER | COMMUNICATION TYPE | FREQUENCY (call/sec) |
|----|---------------------|----------------|----------------|------------------|--------------------|----------------------|
| 1 | VM1 | 100 | VM2 | 20 | ETHERNET | 100 |
| 2 | VM1 | 200 | VM2 | 30 | BLOCK DEVICE | 256 |
| 3 | VM2 | 100 | VM1 | 20 | ETHERNET | 100 |
| 4 | VM2 | 110 | VM3 | 20 | ETHERNET | 105 |

FIG. 13

| ID | TRANSMISSION SOURCE GROUP | REQUEST NUMBER | DESTINATION GROUP | INTERRUPT NUMBER | COMMUNICATION TYPE | FREQUENCY (call/sec) |
|----|---------------------------|----------------|-------------------|------------------|--------------------|--------------------|
| 1 | GROUP 1 | 100 | GROUP 1 | 20 | ETHERNET | 100 |
| 2 | GROUP 1 | 200 | GROUP 1 | 30 | BLOCK DEVICE | 256 |
| 3 | GROUP 1 | 100 | GROUP 1 | 20 | ETHERNET | 100 |
| 4 | GROUP 1 | 110 | GROUP 2 | 20 | ETHERNET | 105 |

INFORMATION PROCESSING DEVICE, ANOMALY DETECTION METHOD, AND COMPUTER-READABLE RECORDING MEDIUM

BACKGROUND

1. Field

The present disclosure relates to data processing technology and, more particularly, to an information processing device, anomaly detection method, and computer program.

2. Description of the Related Art

A technology configured to connect a plurality of networks in a vehicle by a gateway and monitor whether data flowing in the plurality of networks are improper is proposed.

[Patent Literature 1] JP2013-131907

The development of virtualization technology is expected to popularize execution of a plurality of functions, which have been executed in the related art by a plurality of physical electronic control units (ECU), by a plurality of virtual machines (VM) on a single physical ECU. The plurality of VMs communicate on a logical channel, but technologies for detecting an anomaly (attack, etc.) in inter-VM communication have not been proposed satisfactorily.

SUMMARY

The present disclosure addresses this issue, and an illustrative purpose thereof is to provide a technology for detecting an anomaly in inter-VM communication.

An information processing device according to an embodiment of the present disclosure is a device in which virtualization software operates a first virtual machine (VM) and a second VM, the information processing device including: an acknowledgment unit that acknowledges communication data transmitted from the first VM and destined to the second VM; a generation unit that generates a parameter related to communication between the VMs, based on the communication data acknowledged by the acknowledgment unit; and a detection unit that detects abnormal communication, based on the parameter generated by the generation unit.

Another embodiment of the present disclosure relates to an anomaly detection method. The method that causes a device, in which virtualization software operates a first virtual machine (VM) and a second VM, to: acknowledge communication data transmitted from the first VM and destined to the second VM; generate a parameter related to communication between the VMs, based on the communication data acknowledged; and detect abnormal communication, based on the parameter generated.

Optional combinations of the aforementioned constituting elements, and implementations of the present disclosure in the form of systems, computer programs, recording mediums recording computer programs, vehicles on which an information processing apparatus is mounted, etc. may also be practiced as additional modes of the present disclosure.

According to the present disclosure, a technology for detecting an anomaly in inter-VM communication is provided.

BRIEF DESCRIPTION OF DRAWINGS

The invention will now be described by reference to the preferred embodiments. This does not intend to limit the scope of the present invention, but to exemplify the invention. Embodiments will now be described, by way of example only, with reference to the accompanying drawings that are meant to be exemplary, not limiting, and wherein like elements are numbered alike in several figures, in which:

FIG. 4 shows a configuration of a transfer parameter;

FIG. 5 shows an example of the management table;

FIG. 13 shows the management table according to the fifth variation; and

DETAILED DESCRIPTION

The information processing device of the embodiment (ECU 12 described later) measures a communication pattern based on control information used in inter-VM communication and detects abnormal communication (e.g., anomaly due to an attack, failure, bug). More specifically, the information processing device of the embodiment transfers control information indicated by communication data in inter-VM communication to an inspection module (detection unit 38 described later). Further, the information processing device according to the embodiment exploits a change in data volume or control pattern in the presence of a process that abuses a normal communication channel between VMs to detect an anomaly. Further, the information processing device of the embodiment executes a defense process based on the detected information. For example, the information processing device activates the safety function.

Hereinafter, the content delivered from a source VM to a destination VM in inter-VM communication will also be referred to as a communication payload, and control information for inter-VM communication will also be referred to as a communication signal. Data that encompasses a communication payload and a communication signal will be referred to as "communication data".

Figure 1:
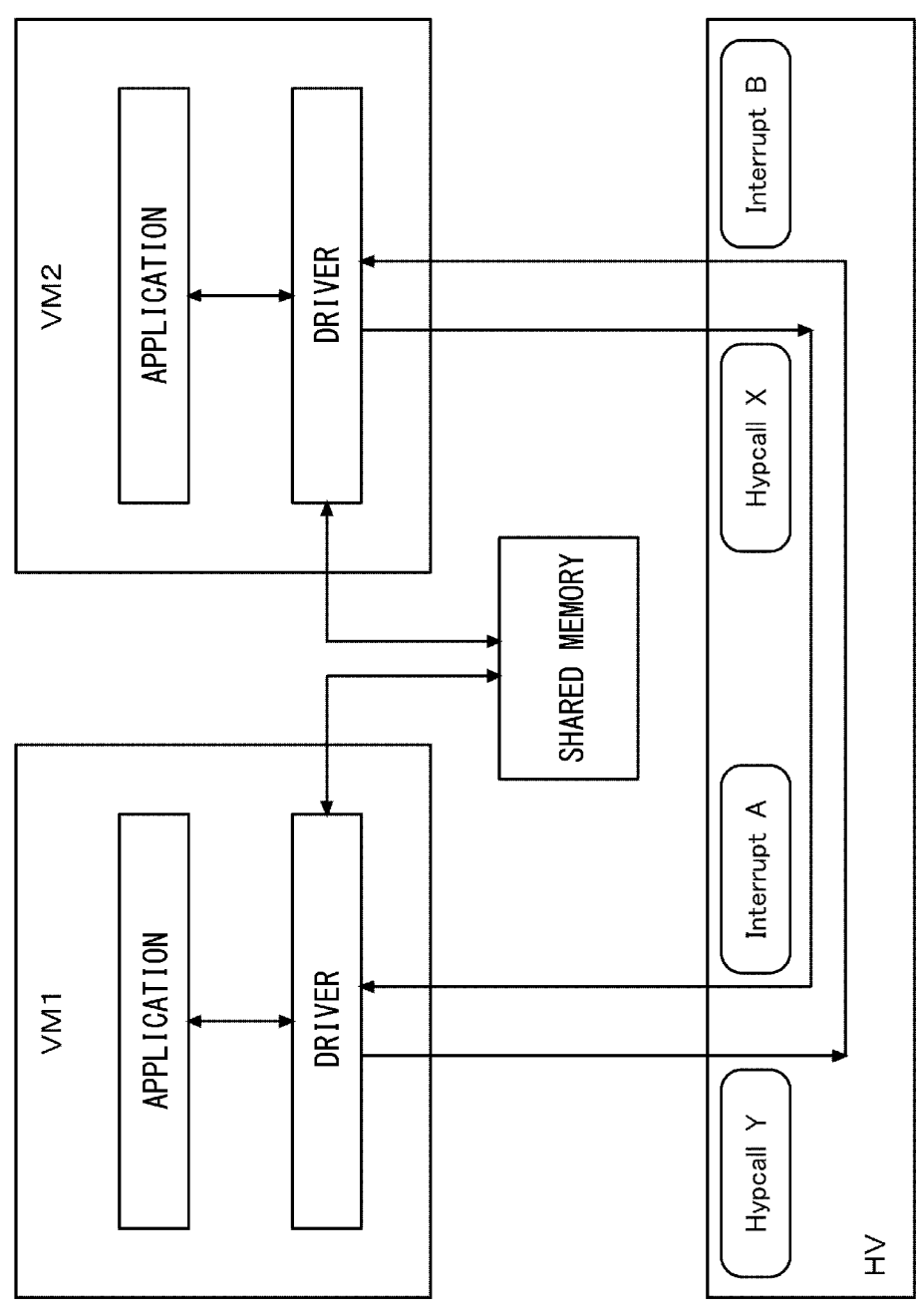
FIG. 1 schematically shows a mechanism of inter-VM communication.

FIG. 1 schematically shows a mechanism of inter-VM communication. Referring to the figure, VM1 and VM2 operate on a hypervisor (HV). An application executed on VM2 delivers the communication data to the driver (the communication handler of the OS) of VM2 by a system call. The driver of VM2 stores the communication payload in a shared memory. Further, the driver of VM2 delivers the communication signal to the HV. More specifically the driver originates a hypervisor call designating a request number X. The HV delivers the communication signal to the driver of VM1 in an interrupt process designating an interrupt number A. The driver of VM1 reads the communication payload from the shared memory based on the communication signal and delivers the communication payload to an application on VM1. Host OS-type virtualization systems, etc. as well as hypervisor-type virtualization systems are available as types of virtualization systems. In a hypervisor-type virtualization system, the hypervisor executes processes like allocation of resources of the hardware. In a host OS-type virtualization system, the virtualization application executed on the host OS executes processes like allocation resources of the hardware. In other words, the hypervisor operates as virtualization software in a hypervisor-type virtualization system, and the host OS and the virtualization application operate as virtualization software in a host OS-type virtualization system. In this embodiment, a hypervisor-type virtualization system is described by way of example, but the embodiment may equally be applied to a guest-OS type virtualization system.

Communication from VM1 to VM2 proceeds in a manner similar to the manner described above. An application executed on VM1 delivers communication data to the driver of VM1 by a system call. The driver of VM1 stores the communication payload in the shared memory. Further, the driver of VM1 delivers the communication signal to the HV. More specifically the driver originates a hypervisor call designating a request number Y. The HV delivers the communication signal to the driver of VM2 in an interrupt process designating an interrupt number B. The driver of VM2 reads the communication payload from the shared memory based on the communication signal and delivers the communication payload to the application on VM2.

Figure 2:
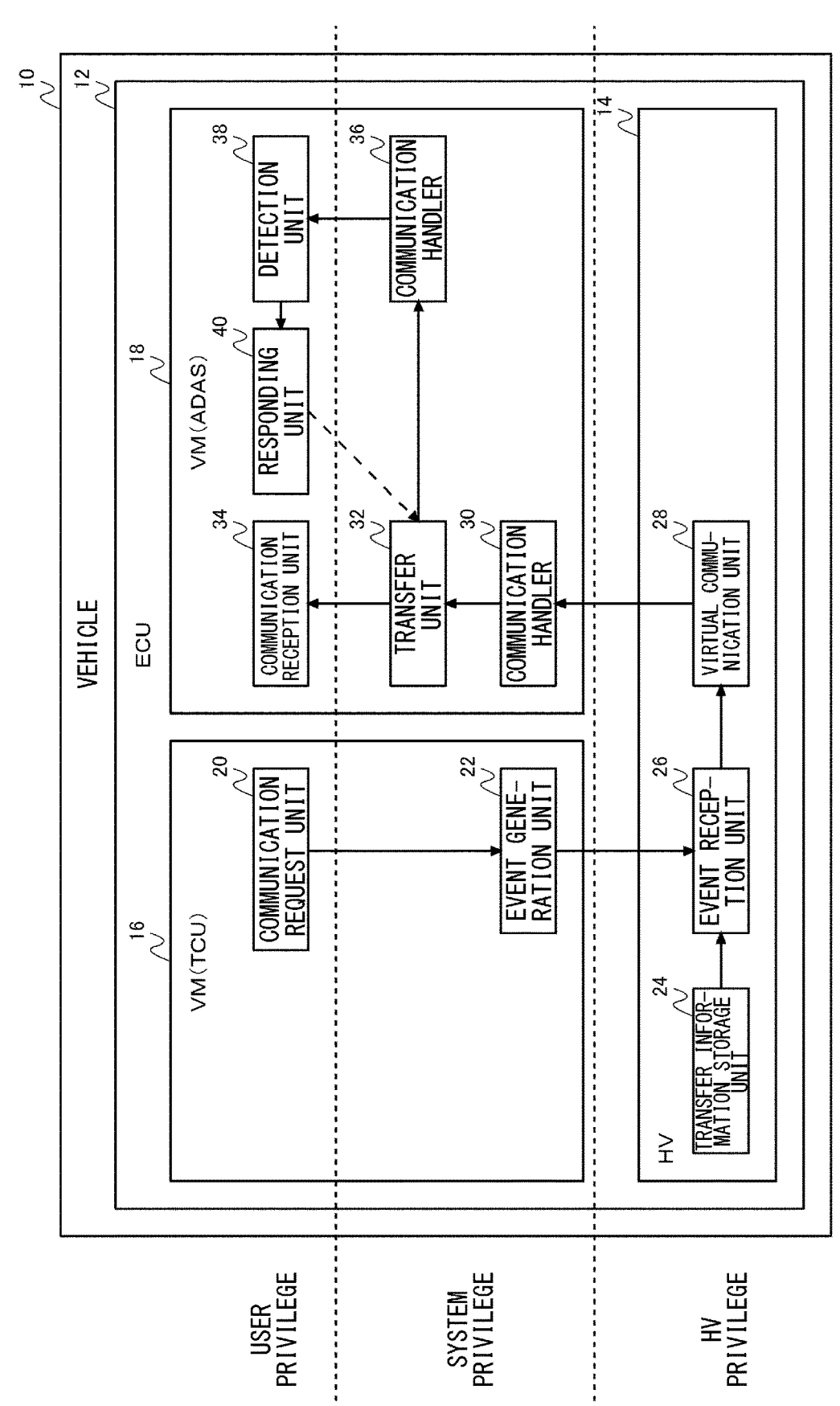
FIG. 2 is a block diagram showing functional blocks of an ECU of the embodiment.

FIG. 2 is a block diagram showing functional blocks of an ECU 12 of the embodiment. The ECU 12 is a microcontroller mounted on a vehicle 10. Further, the ECU 12 is an integrated ECU configured to provide the function of a telematics communication unit (TCU) (e.g., function to communicate with a device external to the vehicle 10) and the function of an advanced driver-assistance system (ADAS) (e.g., advanced emergency braking and cruise control).

The blocks depicted in the block diagram of this disclosure are implemented in hardware such as devices and mechanical apparatus exemplified by a CPU and a memory of a computer, and in software such as a computer program. FIG. 2 depicts functional blocks implemented by the cooperation of these elements. Therefore, it will be understood by those skilled in the art that the functional blocks may be implemented in a variety of manners by a combination of hardware and software.

For example, a computer program that includes modules corresponding to at least some functional blocks of the plurality of functional blocks of the ECU 12 shown in FIG. 2 may be stored in the ROM of the ECU 12. The CPU of the ECU 12 may exhibit the functions of the functional blocks shown in FIG. 2 by reading this computer program into the RAM and executing the program.

The functional blocks placed in the "system privilege" area of FIG. 2 are functions executed with the system privilege and are exemplified by the function of the operating system (OS) of the VM. Further, the functional blocks placed in the "user privilege" area are functions executed with the user privilege and are exemplified by the function of an application executed on the OS. Further, the functional blocks placed in the "HV privilege" area are functions executed with the HV privilege.

The ECU 12 includes a HV 14 and a VM 16 and a VM 18 that operate on the HV 14. The VM 16 provides the function of TCU and is assumed to be as an attack entry point in the embodiment. The VM 18 provides the function of ADAS and is assumed to be a target of attack in the embodiment. The ECU 12 further includes a shared memory (not shown) accessed by the HV 14, the VM 16, the VM18.

The VM 16 includes a communication request unit 20 and an event generation unit 22. The communication request unit 20 delivers communication data generated in a process of an application and destined to the VM 18 to the event generation unit 22 by a system call.

The event generation unit 22 stores the communication payload in the communication data in the shared memory and outputs a communication signal based on the communication data to the HV 14 by a hypervisor call. The communication signal (hypervisor call) includes the ID of the VM 16, the originating VM, and a request number. The request signal corresponds to the address in the shared memory storing the communication payload.

The HV 14 includes a transfer information storage unit 24, an event reception unit 26, and a virtual communication unit 28. The transfer information storage unit 24 stores correspondence between a combination of the originating VM and the request number and a combination of the destination VM and the interrupt number. When the event reception unit 26 receives a hypervisor call from the VM 16, the event reception unit 26 resolve the destination VM and the interrupt number. More specifically, the event reception unit 26 refers to the transfer information storage unit 24 and identifies a combination of the destination VM and the interrupt number mapped to the combination of the originating VM and the request number indicated by the hypervisor call.

The virtual communication unit 28 delivers the communication signal to the VM 18 by issuing an interrupt to the VM identified by the event reception unit 26 (in this case, the VM 18), designating the interrupt number identified by the event reception unit 26. The communication signal (interrupt) includes the ID of the originating VM (VM 16), the request number, the ID of the destination VM (VM 18), and the interrupt number.

The VM 18 includes a communication handler 30, a transfer unit 32, a communication reception unit 34, a communication handler 36, a communication reception unit 34, a detection unit 38, and a responding unit 40. The communication reception unit 34 receives the communication data transferred by the transfer unit 32, i.e., the communication data transmitted from the VM 16 and destined to the VM 18. An application on the VM 18 executes the functions of ADAS based on the communication data received by the communication reception unit 34.

The communication handler 30 receives the communication signal input from the HV 14 by the interrupt. The communication handler 30 reads the communication payload from the area in the shared memory corresponding to the request number indicated by the communication signal and delivers communication data including the content of the communication signal and the content of the communication payload to the transfer unit 32.

Figure 3:
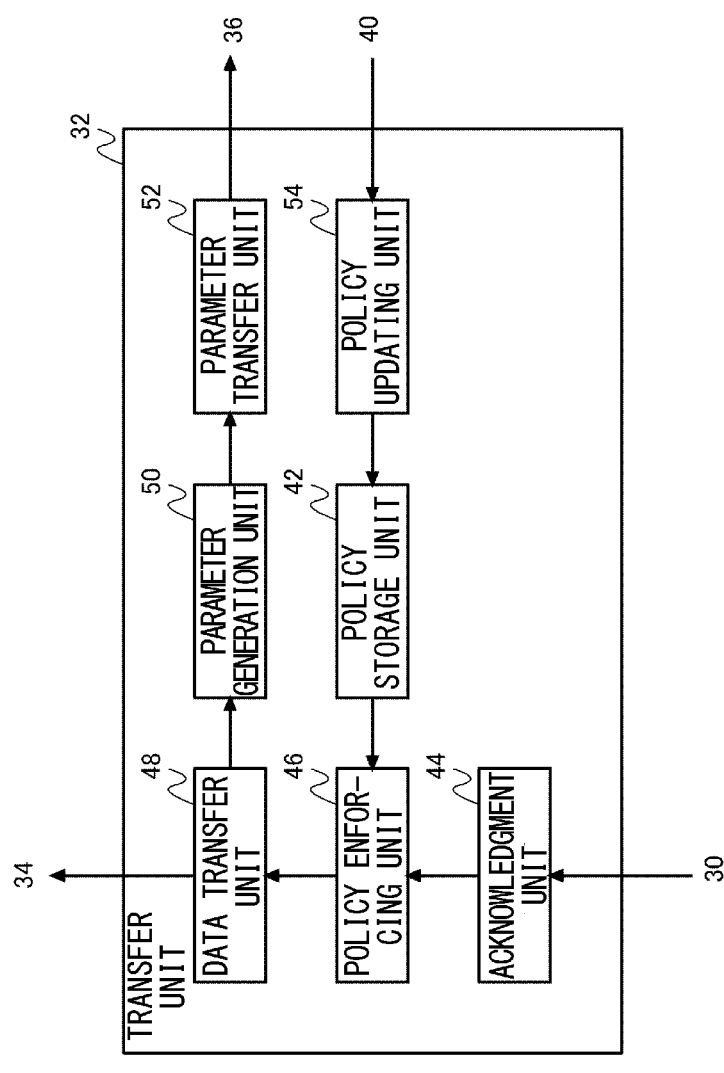
FIG. 3 is a block diagram showing the transfer unit of FIG. 2 in detail.

FIG. 3 is a block diagram showing the transfer unit 32 of FIG. 2 in detail. The transfer unit 32 includes a policy storage unit 42, an acknowledgment unit 44, a policy enforcing unit 46, a data transfer unit 48, a parameter generation unit 50, a parameter transmission unit 52, and a policy updating unit 54.

The policy storage unit 42 stores a security policy related to communication data. The security policy may include a filtering condition for communication data. The filtering condition may be, for example, a value included in the communication data, data size, similarity with a known attack pattern.

The acknowledgment unit 44 acknowledges the communication data transmitted from the VM 16, transferred by the HV 14, and destined to the VM 18 via the communication handler 30. The policy enforcing unit 46 performs a filtering process for filtering the communication data acknowledged by the acknowledgment unit 44 in accordance with the security policy stored in the policy storage unit 42. The policy enforcing unit 46 may discard the communication data that violates the security policy, i.e., the communication data that meets the filtering condition. Further, the policy enforcing unit 46 may record the communication data in a log or save it in an external server.

The data transfer unit 48 transfers the communication data acknowledged by the acknowledgment unit 44 to a higher-level application (the communication reception unit 34) in accordance with a predetermined security policy. More specifically, the data transfer unit 48 transfers the communication data determined to comply with the security policy by the policy enforcing unit 46 or the communication data determined not to violate the security policy to the communication reception unit 34. The operation of the transfer unit 48 may be configured for push transfer or pull transfer or may be configured to share data via the shared memory. The mode of operation is non-limiting.

The parameter generation unit 50 generates a parameter related to inter-VM communication (hereinafter, "transfer parameter") based on the communication data acknowledged by the acknowledgment unit 44, i.e., the communication data transferred by the data transfer unit 48 to the communication reception unit 34. The transfer parameter can be said to be a parameter used in inter-VM communication and can also be said to be a parameter necessary for inter-VM communication.

FIG. 4 shows a configuration of a transfer parameter. The transfer parameter includes the ID of the originating VM, request number, ID of the destination VM, interrupt number, protocol number, and data size. The parameter generation unit 50 may extract, measure, and generate items of the transfer parameter from the communication data (including the communication signal and the communication payload). Further, when the pointer denoting the memory address storing a value of the transfer parameter is included in the communication data, the parameter generation unit 50 may read the value from the memory address and set the value in the transfer parameter. The transfer parameter shown in FIG. 4 is by way of example only. The transfer parameter may be a combination of the ID of the originating VM and the ID of the destination VM or a combination of the IDs with a protocol number (protocol type).

Referring back to FIG. 3, the parameter transmission unit 52 transmits the transfer parameter generated by the parameter generation unit 50 to the detection unit 38 (in the embodiment, the communication handler 36). The policy updating unit 54 updates the policy applied to the policy enforcing unit 46, i.e., updates the security policy applied to the filtering of the communication data, in accordance with an update request transmitted from the responding unit 40.

Referring back to FIG. 2, the communication handler 36 receives the transfer parameter transmitted from the transfer unit 32 and delivers the received transfer parameter to the detection unit 38. The detection unit 38 detects abnormal communication based on a management table and the transfer parameter transmitted from the transfer unit 32.

The management table includes a pattern of inter-VM communication and statistical information related to inter-VM communication. FIG. 5 shows an example of the management table. Each record in the management table of FIG. 5 includes a communication pattern ID, ID of the originating VM, request number, ID of the destination VM, interrupt number, communication type (communication protocol), and frequency (number of times of communication/second). When the detection unit 38 acknowledges the transfer parameter transmitted from the transfer unit 32, the detection unit 38 identifies a record (referred to as "update target record") that meets the combination of the originating VM, request number, destination VM, interrupt number, and communication type, which is a communication pattern indicated by the transfer parameter. The detection unit 38 updates the frequency (statistical information) recorded in the update target record, based on the data size indicated by the transfer size.

The detection unit 38 may detect that abnormal communication occurs in the following cases. (1) The frequency of update target records exceeds a predetermined threshold value. (2) The data size indicated by the transfer parameter exceeds a predetermined threshold value. (3) The communication volume in the update target record exceeds a predetermined threshold value in the case the management table manages the data size per a unit time (i.e., communication volume). (4) The communication pattern indicated by the transfer parameter (e.g., a combination of the originating VM, request number, destination VM, interrupt number, and communication type) is a communication pattern not registered in the management table. (5) The number of TCP sessions or the number of files opened for each communication pattern exceeds a predetermined threshold value in the case the management table manages the number of TCP sessions or the number of files opened. In other words, the detection unit 38 may detect abnormal communication when the communication between VMs meets a predetermined condition as described above. A determination as to whether a predetermined condition is met may not be a rule-based determination. For example, AI technology such as a machine learning model may be used for determination.

Referring back to FIG. 2, the responding unit 40 takes measures to counter abnormal communication in accordance with the result of detection by the detection unit 38. When abnormal communication is detected by the detection unit 38, the responding unit 40 of the embodiment updates the security policy applied by the policy enforcing unit 46 of the transfer unit 32. The responding unit 40 may cause the policy updating unit 54 of the transfer unit 32 to update the security policy by transmitting a request for updating the security policy to the transfer unit 32. The request for updating may request that the security policy stored in the policy storage unit 42 be updated to ensure more safety (to make the communication data meet the target of filtering more easily). Alternatively, the request for updating may request that, of a plurality of security policies stored in the policy storage unit 42, the security policy ensuring relatively more safety be applied.

In one variation, the responding unit 40 may manage an alert level and update the alert level in accordance with the result of detection by the detection unit 38. In this case, the responding unit 40 may select a detection rule in the detection unit 38 in accordance with the alert level. Alternatively, the responding unit 40 may perform a predetermined safety process (e.g., acceleration suppression or emergency braking in the vehicle 10) in coordination with a driving control unit (not shown). Still alternatively, the responding unit 40 may record, in a log, the fact of detection of abnormal communication and the transfer parameter (information source) that results in the detection. The responding unit 40 may notify a server external to the vehicle 10 of the detection.

Figure 6:
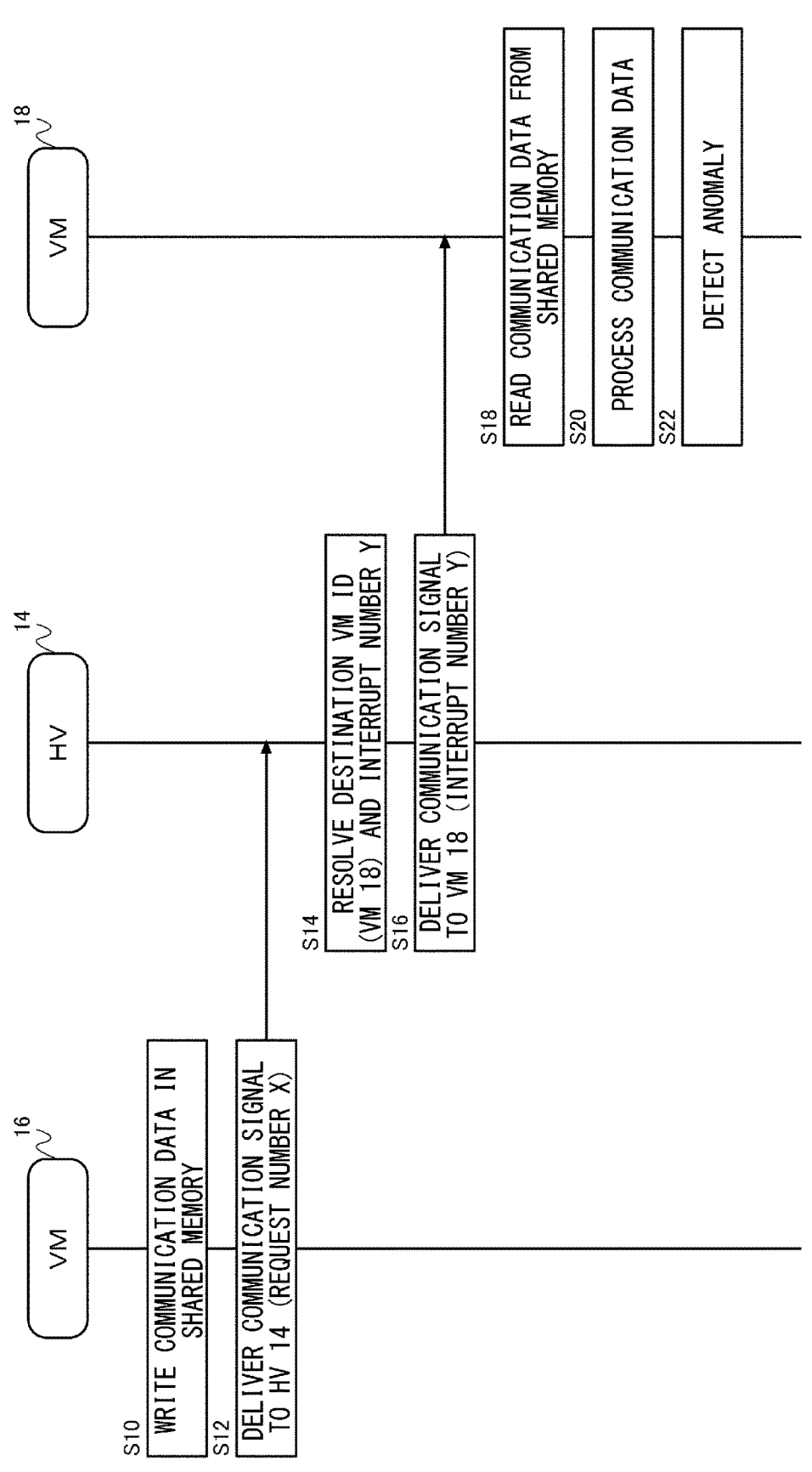
FIG. 6 is a sequence chart showing the operation in the ECU in inter-VM communication.

A description will be given of the operation of the ECU 12 having the configuration described above. FIG. 6 is a sequence chart showing the operation in inter-VM communication in the ECU 12. The communication request unit 20 of the VM 16 delivers communication data, which should be delivered to the VM 18, to the event generation unit 22. The event generation unit 22 of the VM 16 writes the communication data in the shared memory (S10). The event generation unit 22 of the VM 16 delivers the communication signal to the HV 14 by a hypervisor call (S12). The event reception unit 26 of the HV resolves the destination VM (in the case, the VM 18) and the interrupt number. The virtual communication unit 28 of the HV 14 delivers the communication signal to the VM 18 by an interrupt (S16).

The communication handler 30 of the VM 18 reads the communication payload that the VM 16 stores in the shared memory, based on the communication signal delivered from the HV 14 (S18). The application in the VM 18 (the communication reception unit 34) acknowledges the communication data via the transfer unit 32 and performs a process based on the communication data (S20). The detection unit 38 of the VM 18 acknowledges the transfer parameter generated by the transfer unit 32 and detects an anomaly based on the transfer parameter (S22).

Figure 7:
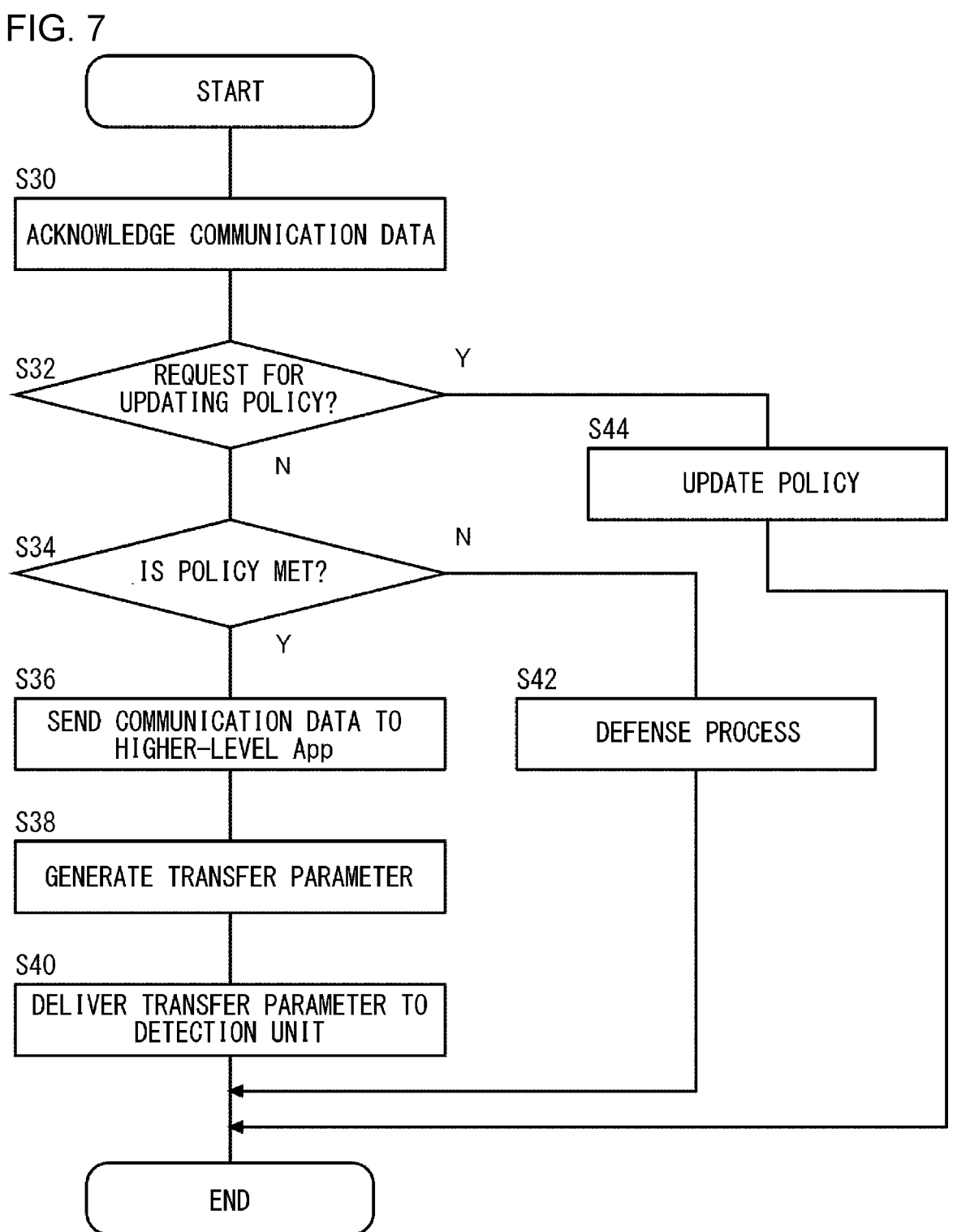
FIG. 7 is a flowchart showing the operation of the transfer unit.

FIG. 7 is a flowchart showing the operation of the transfer unit 32. The acknowledgment unit 44 acknowledges the communication data, including the content of the communication signal delivered from the HV 14 and the content of the communication payload read from the shared memory, from the communication handler 30. Further, the acknowledgment unit 44 acknowledges the communication data, which could include a request for updating the security policy, transmitted from the responding unit 44 (S30).

When the communication data is not a request for updating the security policy (N in S32), the policy enforcing unit 46 determines whether the communication data meets the security policy. When the communication data meets the security policy (Y in S34), the data transfer unit 48 delivers the communication data to a higher-level application (the communication reception unit 34) (S36). The parameter generation unit 50 generates the transfer parameter based on the communication data (S38). The parameter transmission unit 52 delivers the transfer parameter to the detection unit 38 via the communication handler 36 (S40).

When the communication data violates the security policy (N in S34), the policy enforcing unit 46 performs a predetermined defense process (S42). For example, the policy enforcing unit 46 discards the communication data. When the communication data is a request for updating the security policy (Y in S32), the policy updating unit 54 updates the security policy applied to the filtering of communication data (S44). The transfer unit 32 repeatedly executes the process shown in the figure every time the transfer unit 32 acknowledges communication data.

Figure 8:
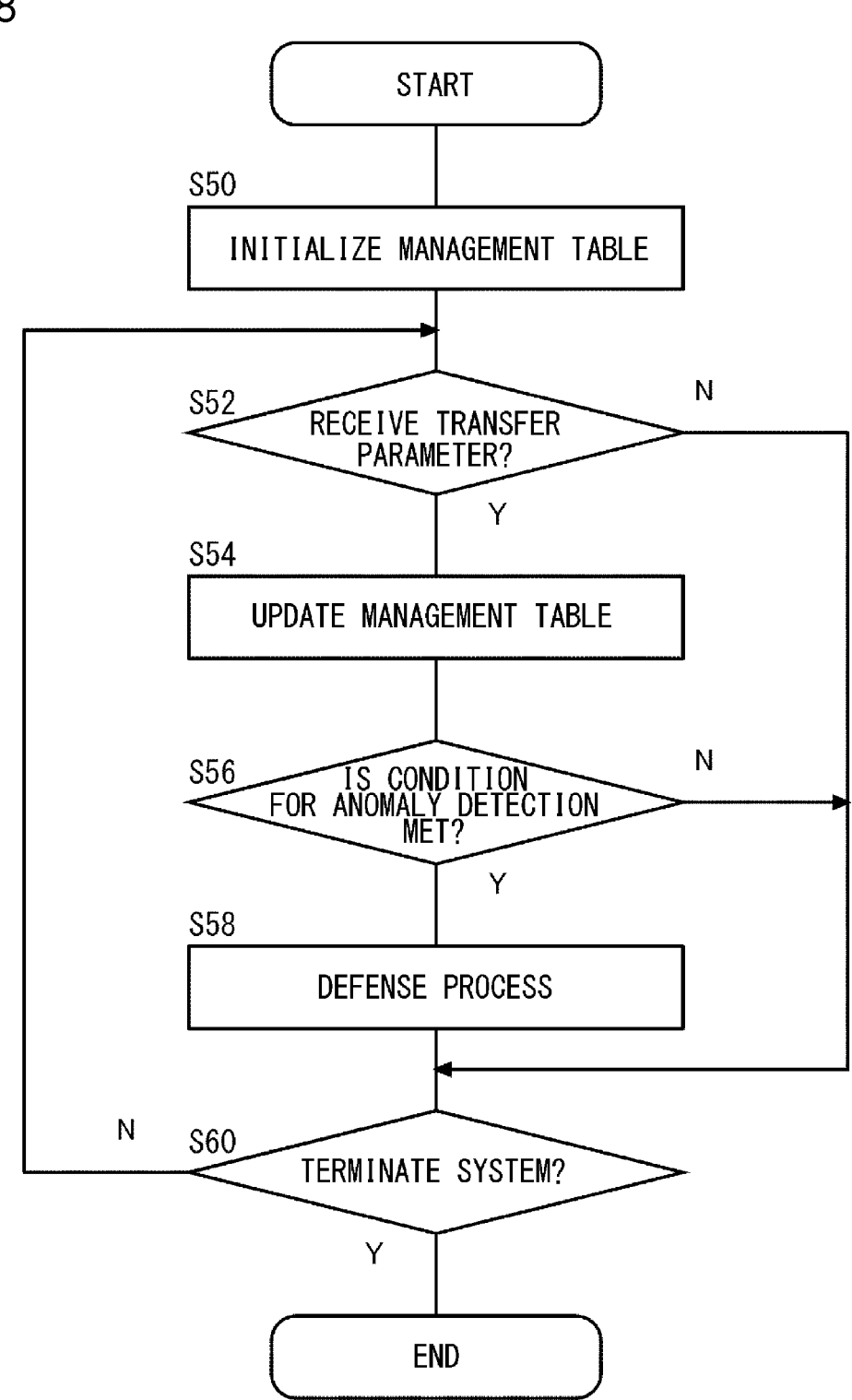
FIG. 8 is a flowchart showing the operation of the detection unit and the responding unit.

FIG. 8 is a flowchart showing the operation of the detection unit 38 and the responding unit 40. When the system is started (e.g., when the power of the vehicle 10 is turned on), the detection unit 38 initializes the management table (S50). When the detection unit 38 receives the transfer parameter generated by the transfer unit 32 via the communication handler 36 (Y in S52), the detection unit 38 updates the management table (S54). When a condition for detection of anomaly is met (e.g., when the communication frequency of a communication pattern corresponding to the transfer parameter exceeds a predetermined threshold value) (Y in S56), the responding unit 40 performs a predetermined defense process (S58). For example, the responding unit 40 updates the security policy applied to the filtering process executed by the transfer unit 32.

When the condition for anomaly detection is not met (N in S56), the process in S58 is skipped. When the detection unit 38 has not received the transfer parameter (N in S52), the processes in S54-S58 are skipped. When the condition to terminate the system is not met (e.g., when the power-on status of the vehicle 10 is maintained) (N in S60), control returns to S52. When the condition to terminate the system is met (e.g., when the power of the vehicle 10 is turned off) (Y in S60), the flow of the figure is terminated.

When there is a process that abuses a normal communication channel between VMs, the data volume or control pattern changes. The ECU 12 according to the embodiment uses this to detect an anomaly. This allows efficient detection of anomaly in inter-VM communication. In further accordance with the ECU 12 of the embodiment, the safety of the ECU 12 and the vehicle 10 can be increased by executing measures to counter the abnormal communication detected. In still further accordance with the ECU 12 of the embodiment, it is easy to update the security policy related to transfer of communication data properly based on the detection of abnormal communication.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

Figure 9:
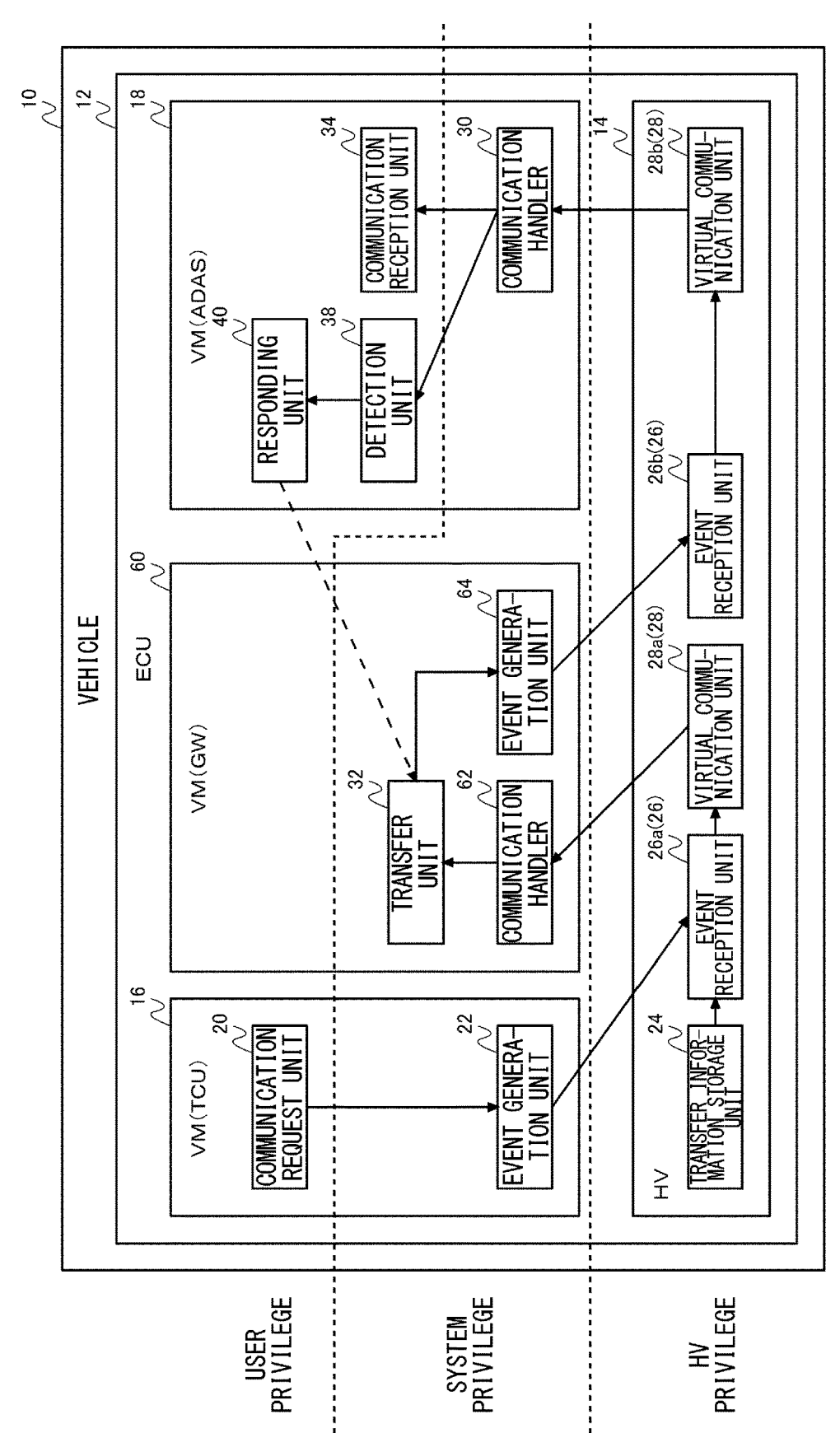
FIG. 9 is a block diagram showing functional blocks of the ECU according to the first variation.

A description will be given of the first variation. FIG. 9 is a block diagram showing functional blocks of the ECU 12 according to the first variation. Of the functional blocks of the ECU 12 of the first variation, those functional blocks identical to or corresponding to functional blocks of the ECU 12 according to the embodiment are denoted by the same reference numerals as used in the embodiment. Hereinafter, a repeated explanation of the detail already explained will be omitted, and only the differences from the embodiment will be explained.

The ECU 12 of the first variation further includes a VM 60 that provides the function of a gateway (GW) for relaying inter-VM communication. The VM 60 includes a communication handler 62, an event generation unit 64, and a transfer unit 32. The VM 18 (ADAS) that is attacked includes a communication handler 30, a communication reception unit 34, a detection unit 38, and a responding unit 40.

The transfer unit 32 of the VM 60 acknowledges, via the HV 14, communication data transmitted from the VM 16 and destined to the VM 18. The transfer unit 32 transfers the communication data to the VM 18 via the HV 14. An application in the VM 18 receives the communication data transmitted from the VM 16 and destined to the VM 18 in the communication reception unit 34 and performs a process based on the communication data.

Further, the transfer unit 32 of the VM 60 generates the transfer parameter based on the acknowledged communication data destined to the VM 18. The transfer unit 32 transmits the transfer parameter to the VM 18 via the HV 14. The detection unit 38 detects abnormal communication based on the transfer parameter transmitted from the VM 60. When abnormal communication is detected, the responding unit 40 of the VM 18 executes measures to counter the abnormal communication. For example, the responding unit 40 updates the security policy of the transfer unit 32. The ECU 12 of the first variation provides the same advantage as that of the ECU 12 of the embodiment.

Figure 10:
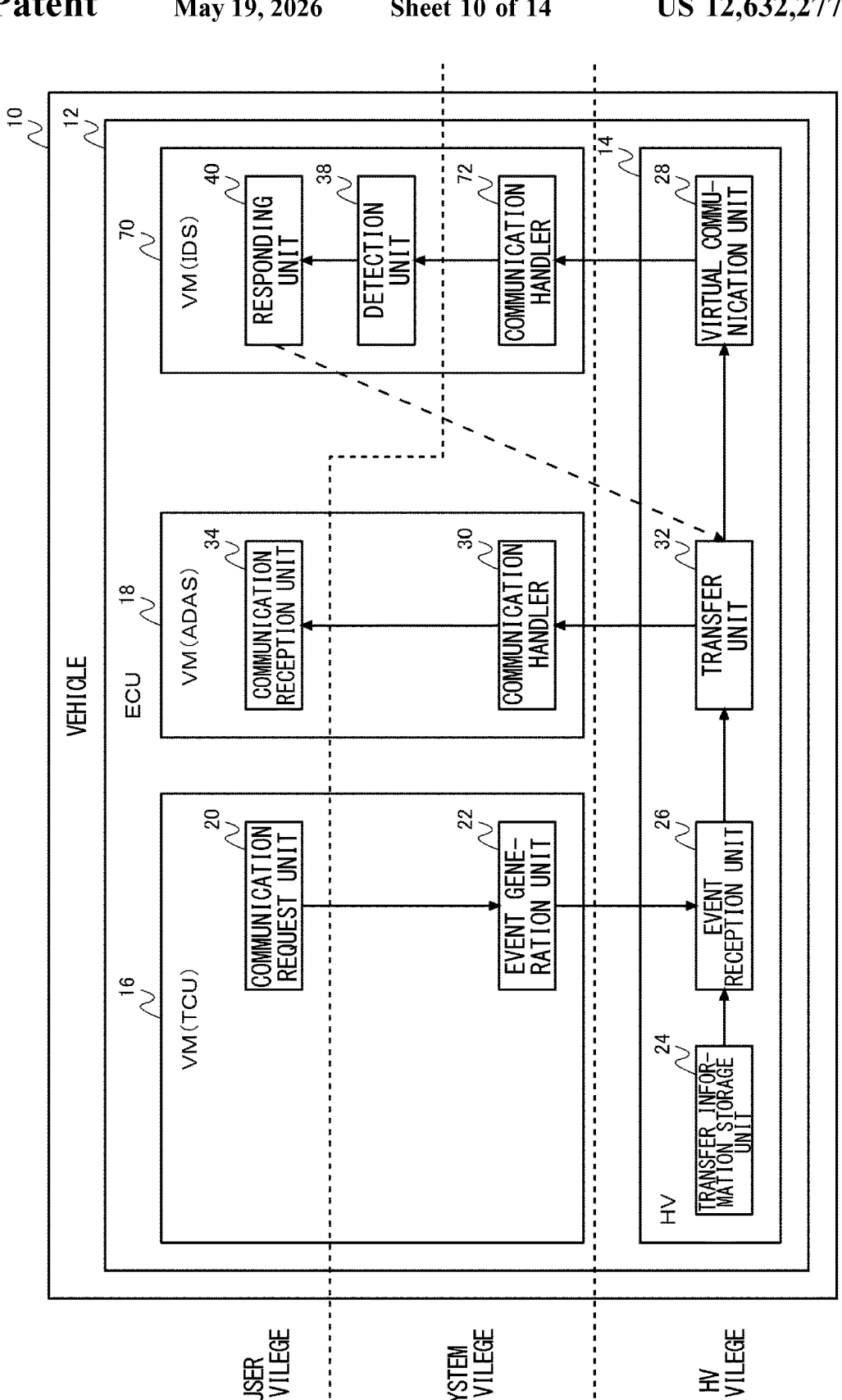
FIG. 10 is a block diagram showing functional blocks of the ECU according to the second variation.

A description will be given of the second variation. FIG. 10 is a block diagram showing functional blocks of the ECU 12 according to the second variation. Of the functional blocks of the ECU 12 according to the second variation, those functional blocks identical to or corresponding to functional blocks of the ECU 12 according to the embodiment are denoted by the same reference numerals. Hereinafter, a repeated explanation of the detail already explained will be omitted, and only the differences from the embodiment will be explained.

The ECU 12 according to the second variation differs from the ECU 12 according to the embodiment in that the ECU 12 according to the second variation further includes a VM 70 that provides the function of an intrusion detection system (IDS) and that the HV 14 includes the transfer unit 32. The VM 70 (IDS) includes a communication handler 72, a detection unit 38, and a responding unit 40. Further, the VM 18 (ADAS) that is attacked includes a communication handler 30 and a communication reception unit 34.

The transfer unit 32 of the HV 14 acknowledges communication data (communication signal) transmitted from the VM 16 and destined to the VM 18. The transfer unit 32 delivers the communication data (communication signal) to the VM 18. The communication handler 30 of the VM 18 reads the communication payload from the shared memory based on the communication signal. An application of the VM 18 receives the communication data including the communication payload in the communication reception unit 34 and executes a process based on the communication data.

The transfer unit 32 of the HV 14 reads the communication payload from the shared memory based on the communication signal. The transfer unit 32 generates the transfer parameter based on the communication data including the communication signal and the communication payload and transmits the transfer parameter to the VM 70. The detection unit 38 of the VM 70 detects abnormal communication based on the transfer parameter transmitted from the HV 14. When abnormal communication is detected, the responding unit 40 of the VM 70 executes measures to counter the abnormal communication. For example, the responding unit 40 updates the security policy of the transfer unit 32. The ECU 12 according to the second variation provides the same advantage as that of the ECU 12 of the embodiment.

Figure 11:
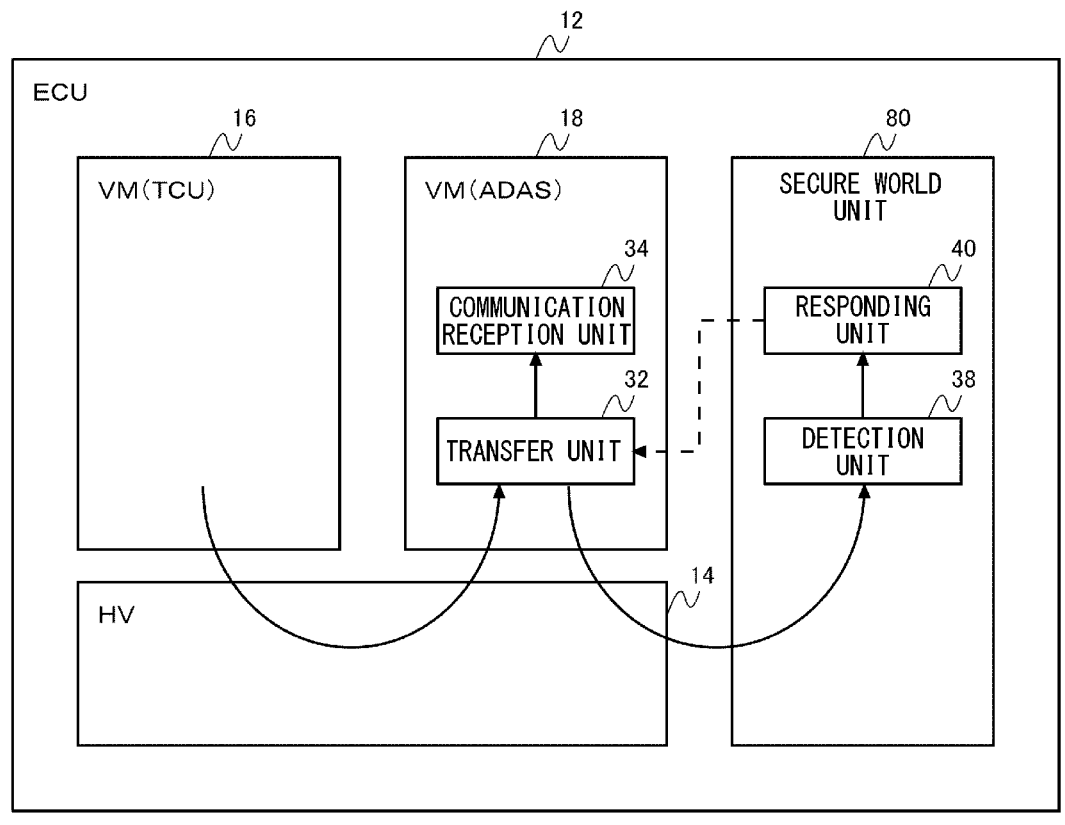
FIG. 11 is a block diagram showing functional blocks of the ECU according to the third variation.

A description will be given of the third variation. FIG. 11 is a block diagram showing functional blocks of the ECU 12 according to the third variation. The ECU 12 of the third variation further includes a secure world unit 80 dedicated the execution of a security-related process such as authentication. The secure world unit 80 includes a detection unit 38 and a responding unit 40.

The execution environment of the HV 14, the VM 16, and the VM 18 is called a normal world. A process in a normal world can access a process in the secure world unit 80 only by calling an application programming interface (API) defined by the secure world unit 80. The configuration of the ECU 12 shown in FIG. 11 can be understood as being derived from replacing the VM 70 (IDS) of the second variation shown in FIG. 10 by the secure world unit 80.

The transfer unit 32 of the VM 18 that is attacked generates the transfer parameter based on the acknowledged communication data destined to the VM 18. The transfer unit 32 transmits the transfer parameter to the secure world unit 80 via the HV 14. For example, the HV 14 delivers the transfer parameter to the detection unit 38 of the secure world unit 80, by calling a predetermined API of the secure world unit 80, passing the transfer parameter as an argument.

The detection unit 38 of the secure world unit 80 detects abnormal communication based on the transfer parameter transmitted from the VM 18. When abnormal communication is detected, the responding unit 40 of the secure world unit 80 executes measures to counter the abnormal communication. For example, the responding unit 40 updates the security policy of the transfer unit 32 of the VM 18. The ECU 12 according to the third variation provides the same advantage as that of the ECU 12 of the embodiment.

As indicated in the embodiment and the first-third variations, it is desired that the transfer unit 32 (including the parameter generation unit 50) be implemented in an execution environment more reliable than the VM 16 at an attack entry point. As already described, the VM 16 as a TCU communicates with a device external to the vehicle 10 and so can easily become an attack entry point and is relatively less reliable. Meanwhile, the VM 18 (ADAS), the VM 60 (GW), and the HV 14 do not have an interface with a device external to the vehicle 10 and so are relatively more reliable.

It is therefore desired that the transfer unit 32 for generating the transfer parameter that servers as a basis for detection of abnormal communication be implemented in the VM 18 (ADAS) (the embodiment and the third variation) or in the VM 60 (GW) (first variation), or in the HV 14 (second variation). This makes it easy to prevent the precision and accuracy of anomaly detection from being lowered due to an attack to the transfer unit 32.

Further, as indicated in the embodiment and the first-third variations, it is desired that the detection unit 38 and the responding unit 40 be implemented in an execution environment more reliable than the VM 16 at an attack entry point. As already described, the VM 16 as a TCU communicates with a device external to the vehicle 10 and so can easily become an attack entry point and is relatively less reliable. Meanwhile, the VM 18 (ADAS), the VM 70 (IDS), and the secure world unit 80 do not have an interface with a device external to the vehicle 10 and so are relatively more reliable.

It is therefore desired that the detection unit 38 for detecting abnormal communication and the responding unit 40 for executing measures to counter abnormal communication be implemented in the VM 18 (ADAS) (the embodiment and the third variation) or in the VM 70 IDS) (second variation), or in the secure world unit 80 (third variation). This makes it easy to prevent the precision and accuracy of anomaly detection from being lowered because of an attack to the detection unit 38. It also makes it easy to prevent failure to execute proper measures to counter an anomaly due to an attack to the responding unit 40.

Figure 12:
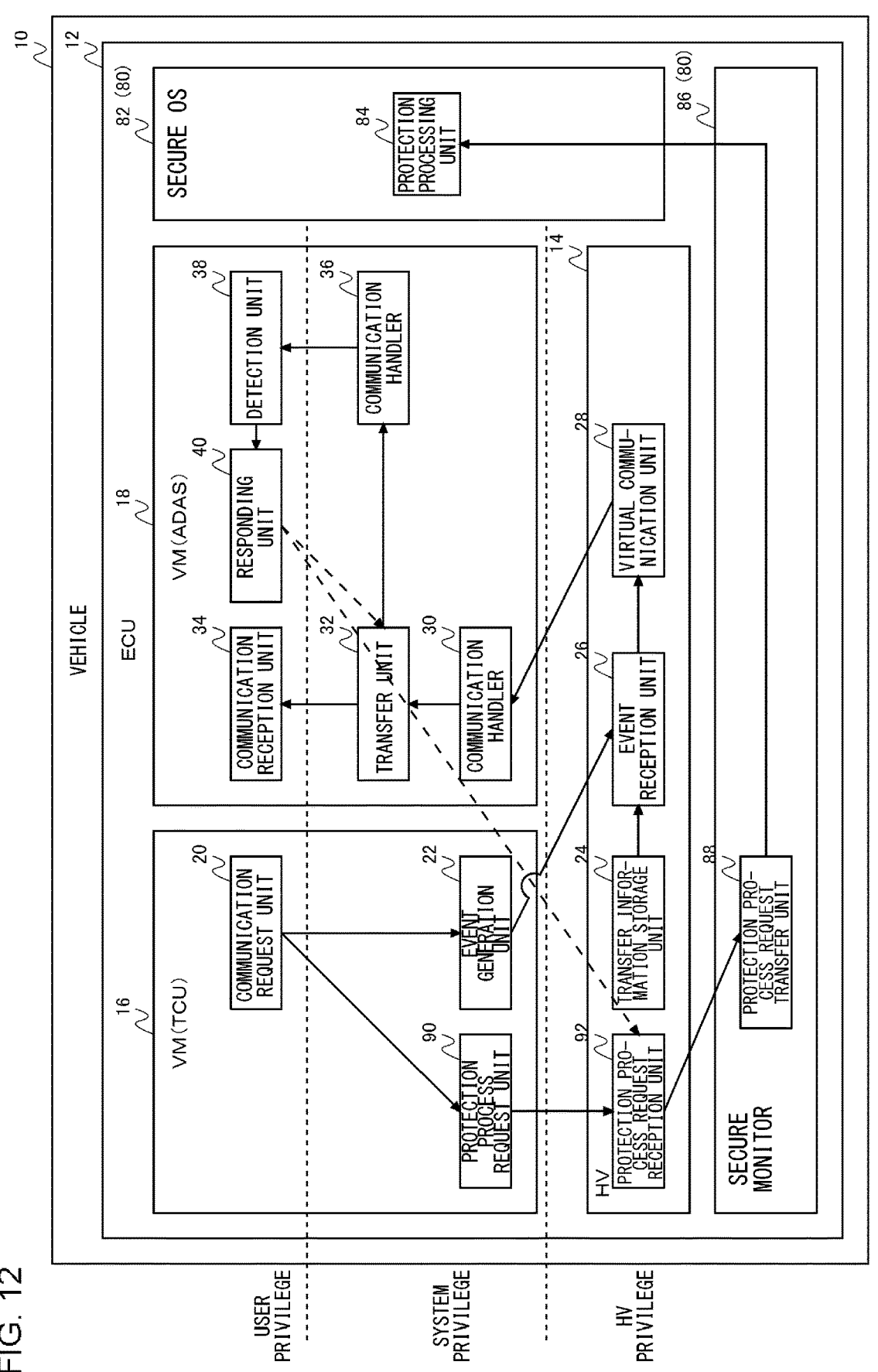
FIG. 12 is a block diagram showing functional blocks of the ECU according to the fourth variation.

A description will be given of the fourth variation. FIG. 12 is a block diagram showing functional blocks of the ECU 12 according to the fourth variation. In addition to the HV 14, the VM 16, and the VM 18, the ECU 12 of the fourth variation includes a secure OS 82 and a secure monitor 86 corresponding to the secure world unit 80 of the third variation. The secure OS 82 and the secure monitor 86 are execution environments more reliable than the virtualization software (e.g., the HV 14, the VM 16, the VM 18).

The secure OS 82 includes a protection processing unit 84 that performs a predetermined protection process. A protection process is a process that deals with information for which improper acquisition from outside should be prevented and is a process that should be executed with a privilege more limited than that of the virtualization software. For example, the protection process may include an encryption process and a decoding process that use a protected key.

The VM 16 includes a protection process request unit 90, the HV 14 includes a protection process request reception unit 92, and the secure monitor 86 includes a protection process request transfer unit 88. The protection process request unit 90 of the VM 16 outputs a request for protection process to the HV 14 in response to a request from the communication request unit 20 (i.e., an application operating on the VM 16). The protection process request reception unit 92 of the HV 14 receives the request for protection process from the VM 16 and delivers the request for protection process to the secure monitor 86 by calling the API of the secure monitor 86. The protection process request transfer unit 88 of the secure monitor 86 transfers the request for protection process acknowledged from the HV 14 to the protection processing unit 84 of the secure OS 82. The protection processing unit 84 of the secure OS 82 executes a protection process in response to the request transferred from the protection process request transfer unit 88. The protection processing unit 84 may return the result of executing the protection process (e.g., encrypted data or plain text data resulting from decoding) to the communication request unit 20 (i.e., an application operating on the VM 16).

When the detection unit 38 detects an anomaly, the responding unit 40 of the VM 18 prevents the execution of the protection process in the protection processing unit 84 in response to the request from the VM 16. In this variation, when the detection unit 38 detects an anomaly, the responding unit 40 transmits a signal directing the request for protection process output from the VM 16 not to be delivered to the secure monitor 86, i.e., a signal requesting that the request for protection process output from the VM 16 be blocked, to the protection process request reception unit 92.

According to this variation, when an anomaly is detected by the detection unit 38, i.e., when the state of the source of request for protection process is determined to be abnormal, the request directed to the protection processing unit 84 for a protection process is blocked. This prevents input of improper data to the protection processing unit 84 and execution of a protection process based on improper data and so further increases the safety of the ECU 12.

A description will now be given of the fifth variation. FIG. 13 shows the management table according to the fifth variation. The communication pattern defined by each record in the management table is a communication pattern for communication between groups including one or a plurality of VMs. Group 1 shown in FIG. 1 includes VM1 and VM2 shown in FIG. 5. Further, group 2 shown in FIG. 13 includes VM 3 shown in FIG. 5. The detection unit 38 maintains correspondence between a plurality of VMs and a plurality of groups. When the detection unit 38 acknowledges a transfer parameter, the detection unit 38 identifies a record that shows a match with the transmission source group to which the transmission source VM indicated by the transfer parameter belongs, the transmission destination group to which the destination VM indicated by the transfer parameter belongs, the request number, the interrupt number, and the communication type indicated by the transfer parameter. The detection unit 38 updates the statistical information (e.g., frequency) of the identified record and determines whether or not the communication is abnormal.

According to this variation, it is possible to generate statistical information on communication in units of groups (group by group) including a plurality of VMs and to detect an anomaly group by group. For example, by grouping the VMs according to the domain such as power train, body, chassis, vehicle-mounted information device, it is possible to generate statistical information on communication domain by domain and to detect an anomaly domain by domain. In a further variation, the VMs may be grouped according to (1) the VMID (a combination of the transmission source VM and the destination VM, which does not include a request number or an interrupt number), (2) the communication type, (3) the application (application ID) on each VM, (4) the process ID, or (5) the session ID.

Figure 14:
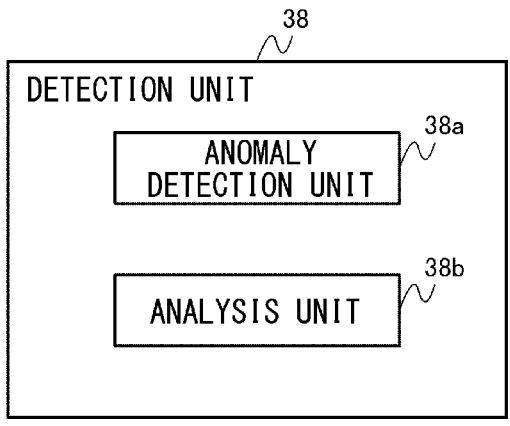
FIG. 14 shows a configuration of the detection unit according to the sixth variation.

A description will now be given of the sixth variation. FIG. 14 shows a configuration of the detection unit 38 according to the sixth variation. The detection unit 38 includes an anomaly detection unit 38a and an analysis unit 38b. The anomaly detection unit 38a corresponds to the detection unit 38 of the embodiment and detects abnormal communication based on the transfer parameter transmitted from the transfer unit 32. Meanwhile, the analysis unit 38b analyzes the communication data destined to the VM 18 transmitted from the transfer unit 32 when the anomaly detection unit 38a detects abnormal communication.

In the sixth variation, when the anomaly detection unit 38a (or the responding unit 40) detects abnormal communication, the anomaly detection unit 38a may notify the transfer unit 32 accordingly. The transfer unit 32 receiving this notification may transmit the communication data including the communication payload to the analysis unit 38b. When the communication payload an abnormal content, the analysis unit 38b detects it according to a predetermined rule or attack pattern. The responding unit 40 executes a predetermined protection process based on the result of analysis and the result of detection by the analysis unit 38b. For example, the responding unit 40 may update the security policy maintained in the transfer unit 32 or record the result of analysis and the result of detection by the analysis unit 38b in a log or save them in a server.

According to this variation, it is possible to prevent an increase in the processing load and facilitate acquisition of further information related to abnormal communication by analyzing the communication data itself when abnormal communication is detected based on the transfer parameter.

A description will now be given of the seventh variation. The event generation unit 22 of the VM 16 may communicate information on various events in the VM 16 to the VM 18 via the HV 14 as in the case of communication events. The various events may include an event indicating that a USB device is connected or an event indicating that the audio function is turned on. For example, an increase in USB communication occurring when a USB device is connected represents normal communication, but an increase in USB communication occurring when a USB device is not connected may be detected as abnormal communication. Further, information indicating an event type may be set as a communication type (protocol type). In this case, the detection unit 38 of the VM 18 may detect abnormal communication when an improper communication type is set in the communication data transmitted from the VM 16. In the case the VM 16 provides the TCU function, the communication type may be determined to be an improper communication type when it includes a value indicating a USB event or an audio event. Further, when block device communication increases in accordance with a request for file open from the VM 16 or on a type of file opened, a determination on normal or abnormal may be made by using the communication speed determined by the file as a threshold value.

In the embodiment and the variations above, the ECU 12 is shown as a solitary physical ECU, but the HV 14, the VM 16, the VM 18, etc. may be implemented as a plurality of physical ECUs. In other words, the functions of HV, VM described in the embodiment and the variations may be exhibited in a system in which a plurality of physical ECUs are coordinated.

Any combination of the embodiment and the variation described above will also be useful as an embodiment of the present disclosure. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

The technologies according to the embodiment and variations may be defined by the following items.

[Item 1]

An information processing device in which virtualization software operates a first virtual machine (VM) and a second VM, the information processing device comprising:

an acknowledgment unit that acknowledges communication data transmitted from the first VM and destined to the second VM;

a generation unit that generates a parameter related to communication between the VMs, based on the communication data acknowledged by the acknowledgment unit; and a detection unit that detects abnormal communication, based on the parameter generated by the generation unit.

According to this information processing device, it is possible to detect an anomaly in inter-VM communication efficiently.

[Item 2]

The information processing device according to item 1, wherein the detection unit detects abnormal communication when the detection unit determines that the communication between the VMs meets a predetermined condition, based on the parameter generated by the generation unit. According to this information processing device, it is possible to detect an anomaly in inter-VM communication efficiently.

[Item 3]

The information processing device according to claim 1 or 2, further including: a data transfer unit that transfers the communication data acknowledged by the acknowledgment unit to an application on the second VM in accordance with a predetermined security policy, which includes a policy related to the parameter.

According to this information processing device, the safety of inter-VM communication can be increased.

[Item 4]

The information processing device according to any one of items 1 through 3, further including: a responding unit that executes measures to counter the abnormal communication in accordance with a result of detection by the detection unit.

According to this information processing device, safety can be increased by executing measures (e.g., a defense process) to counter the abnormal communication detected.

[Item 5]

The information processing device according to item 1 or 2, further including: a data transfer unit that transfers the communication data acknowledged by the acknowledgment unit to an application on the second VM in accordance with a predetermined security policy, which includes a policy related to the parameter; and a responding unit that updates the security policy of the data transfer unit in accordance with a result of detection by the detection unit.

According to this information processing device, it is possible to update the security policy related to transfer of communication data properly, based on detection of abnormal communication.

[Item 6]

The information processing device according to any one of items 1 through 5, wherein the generation unit is implemented in an execution environment more reliable than the first VM.

According to this information processing device, it is easy to prevent the precision and accuracy of anomaly detection from being lowered due to an attack to the generation unit.

[Item 7]

The information processing device according to any one of items 1 through 6, wherein the detection unit is implemented in an execution environment more reliable than the first VM.

According to this information processing device, it is easy to prevent the precision and accuracy of anomaly detection from being lowered due to an attack to the detection unit.

[Item 8]

The information processing device according to any one of items 1 through 7, further including: an analysis unit that analyzes the communication data destined to the second VM when the detection unit detects abnormal communication.

According to this information processing device, it is possible to prevent an increase in the processing load and facilitate acquisition of further information related to abnormal communication by analyzing the communication data itself when abnormal communication is detected based on the transfer parameter.

[Item 9]

The information processing device according to any one of items 1 through 8, wherein the generation unit generates, as the parameter, a parameter including an ID of the first VM and an ID of the second VM.

According to this information processing device, it is possible to detect an anomaly in inter-VM communication efficiently and precisely.

[Item 10]

The information processing device according to item 4 or 5, further including: a protection processing unit implemented in an execution environment more reliable than the virtualization software and adapted to execute a predetermined protection process, wherein, when the detection unit detects an anomaly, the responding unit prevents execution of the protection process in the protection processing unit in response to a request from the first VM.

According to this information processing device, the safety of the device can be increased.

[Item 11]

An anomaly detection method that causes a device, in which virtualization software operates a first virtual machine (VM) and a second VM, to:

acknowledge communication data transmitted from the first VM and destined to the second VM;

generate a parameter related to communication between the VMs, based on the communication data acknowledged; and detect abnormal communication, based on the parameter generated.

According to this anomaly detection method, it is possible to detect an anomaly in inter-VM communication efficiently.

[Item 12]

A computer program that causes a device, in which virtualization software operates a first virtual machine (VM) and a second VM, to:

acknowledge communication data transmitted from the first VM and destined to the second VM;

generate a parameter related to communication between the VMs, based on the communication data acknowledged; and detect abnormal communication, based on the parameter generated.

According to this computer program, it is possible to detect an anomaly in inter-VM communication efficiently.

CROSS-REFERENCE TO RELATED
APPLICATION

This application is based upon and claims the benefit of priority from the prior Japanese Patent Application No. 2019-220119, filed on Dec. 5, 2019, the entire contents of which are incorporated herein by reference.

What is claimed is:

1. An information processing device in which virtualization software operates a first virtual machine (VM) and a second VM in a vehicle, the information processing device comprising:

an acknowledgment unit that acknowledges communication data transmitted from the first VM and destined to the second VM;

a generation unit that generates a parameter related to a communication signal between the first VM and the second VM, based on the communication data acknowledged by the acknowledgment unit;

a data transfer unit that transfers the communication data acknowledged by the acknowledgment unit to an application on the second VM in accordance with a predetermined security policy, which includes a policy related to the parameter;

a detection unit that detects abnormal communication, based on the parameter generated by the generation unit; and a responding unit that executes a measure to counter the abnormal communication in accordance with a result of detection by the detection unit, and that updates the predetermined security policy of the data transfer unit in accordance with the result of detection by the detection unit, wherein the generation unit generates the parameter based on two or more pieces of information out of a source identifier of a source VM and a destination identifier of a destination VM of the communication signal, a request number of the communication signal, an interrupt number of the communication signal, or a protocol number of the communication signal.

2. The information processing device according to claim 1, wherein the detection unit detects the abnormal communication when the detection unit determines that the communication signal between the first VM and the second VM meets a predetermined condition, based on the parameter generated by the generation unit.

3. The information processing device according to claim 1, wherein the generation unit is implemented in an execution environment more reliable than the first VM.

4. The information processing device according to claim 1, wherein the detection unit is implemented in an execution environment more reliable than the first VM.

5. The information processing device according to claim 1, further comprising:

an analysis unit that analyzes the communication data destined to the second VM when the detection unit detects the abnormal communication.

6. The information processing device according to claim 1, wherein the parameter, which is generated by the generation unit, includes an ID of the first VM and an ID of the second VM.

7. The information processing device according to claim 1, further comprising:

a protection processing unit implemented in an execution environment more reliable than the virtualization software and adapted to execute a predetermined protection process, wherein when the detection unit detects an anomaly, the responding unit prevents execution of the predetermined protection process in the protection processing unit in response to a request from the first VM.

8. The information processing device according to claim 1, further comprising:

a Hyper Visor (HV) for operating the first VM and the second VM; and a shared memory accessible to the first VM and the second VM, wherein the acknowledgment unit, the generation unit, and the detection unit are included in the second VM, the first VM transmits to the second VM the communication data including a communication payload as contents to be delivered to the second VM and the communication signal as control information for controlling communication between the first VM and the second VM, and the second VM reads the communication payload stored in the shared memory by the first VM, and the first VM transmits the communication signal to the second VM via the HV, thereby transmitting the communication data from the first VM to the second VM.

9. An anomaly detection method for a device, in which virtualization software operates a first virtual machine (VM) and a second VM in a vehicle, the anomaly detection method comprising:

acknowledging communication data transmitted from the first VM and destined to the second VM;

generating a parameter related to a communication signal between the first VM and the second VM, based on the communication data acknowledged; and transferring the communication data acknowledged by the acknowledging to an application on the second VM in accordance with a predetermined security policy, which includes a policy related to the parameter;

detecting abnormal communication, based on the parameter generated;

executing a measure to counter the abnormal communication in accordance with a result of detection by the detecting; and updating the predetermined security policy in accordance with the result of detection by the detecting, wherein the parameter is generated based on two or more pieces of information out of a source identifier of a source VM and a destination identifier of a destination VM of the communication signal, a request number of the communication signal, an interrupt number of the communication signal, or a protocol number of the communication signal.

10. The anomaly detection method according to claim 9, wherein the device further includes a Hyper Visor (HV) for operating the first VM and the second VM, and a shared memory accessible to the first VM and the second VM, the acknowledging, the generating, and the detecting are performed in the second VM, the first VM transmits to the second VM the communication data including a communication payload as contents to be delivered to the second VM and the communication signal as control information for controlling communication between the first VM and the second VM, and the second VM reads the communication payload stored in the shared memory by the first VM, and the first VM transmits the communication signal to the second VM via the HV, thereby transmitting the communication data from the first VM to the second VM.

11. A non-transitory computer-readable recording medium encoded with a computer program that causes a device, in which virtualization software operates a first virtual machine (VM) and a second VM in a vehicle, to perform:

acknowledging communication data transmitted from the first VM and destined to the second VM;

generating a parameter related to a communication signal between the first VM and the second VM, based on the communication data acknowledged;

transferring the communication data acknowledged by the acknowledging to an application on the second VM in accordance with a predetermined security policy, which includes a policy related to the parameter;

detecting abnormal communication, based on the parameter generated;

executing a measure to counter the abnormal communication in accordance with a result of detection by the detecting; and updating the predetermined security policy in accordance with the result of detection by the detecting, wherein the parameter is generated based on two or more pieces of information out of a source identifier of the source VM and a destination identifier of a destination VM of the communication signal, a request number of the communication signal, an interrupt number of the communication signal, or a protocol number of the communication signal.

12. The non-transitory computer-readable recording medium according to claim 11, wherein the device further includes a Hyper Visor (HV) for operating the first VM and the second VM, and a shared memory accessible to the first VM and the second VM, the communication data is acknowledged by, the parameter is generated by, and the abnormal communication is detected by the second VM, the first VM transmits to the second VM the communication data including a communication payload as contents to be delivered to the second VM and the communication signal as control information for controlling communication between the first VM and the second VM, and the second VM reads the communication payload stored in the shared memory by the first VM, and the first VM transmits the communication signal to the second VM via the HV, thereby transmitting the communication data from the first VM to the second VM.

* * * * *